United States Patent
Hsu et al.

(10) Patent No.: US 11,880,234 B2
(45) Date of Patent: Jan. 23, 2024

(54) ELECTRONIC DEVICE

(71) Applicant: ASUSTeK COMPUTER INC., Taipei (TW)

(72) Inventors: Chi-Rong Hsu, Taipei (TW); Yi-Ting Chen, Taipei (TW); Po-Nien Chen, Taipei (TW); Chi-Jung Tsai, Taipei (TW); Wei Hsiang Tang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 18 days.

(21) Appl. No.: 17/585,500

(22) Filed: Jan. 26, 2022

(65) Prior Publication Data

US 2022/0334611 A1 Oct. 20, 2022

(30) Foreign Application Priority Data

Apr. 19, 2021 (TW) .................................. 110113878

(51) Int. Cl.
*G06F 1/16* (2006.01)

(52) U.S. Cl.
CPC .......... *G06F 1/1607* (2013.01); *G06F 1/1656* (2013.01); *G06F 1/1669* (2013.01); *G06F 1/1681* (2013.01)

(58) Field of Classification Search
CPC .... G06F 1/1607; G06F 1/1656; G06F 1/1669; G06F 1/1681; G06F 1/1679
See application file for complete search history.

(56) References Cited

U.S. PATENT DOCUMENTS

| | | | | |
|---|---|---|---|---|
| 8,253,518 B2* | 8/2012 | Lauder | ................... | G06F 1/1647 |
| | | | | 361/679.01 |
| 8,988,876 B2* | 3/2015 | Corbin | ................ | G06F 3/04883 |
| | | | | 361/679.58 |
| 9,227,763 B2* | 1/2016 | Gengler | ................. | B65D 25/00 |
| 9,335,793 B2* | 5/2016 | Rothkopf | ............ | G06F 3/04883 |
| 9,474,345 B2* | 10/2016 | Smith | ................... | H04B 1/3888 |
| 9,494,980 B2* | 11/2016 | Corbin | ................... | G06F 3/0202 |
| 10,037,054 B2* | 7/2018 | Corbin | ................... | G06F 3/1446 |
| 10,303,215 B2* | 5/2019 | Corbin | ............... | A63B 71/0622 |
| 10,340,969 B2* | 7/2019 | Smith | .................. | G06F 1/1681 |

(Continued)

FOREIGN PATENT DOCUMENTS

| | | |
|---|---|---|
| CN | 205809783 | 12/2016 |
| CN | 211475410 | 9/2020 |

*Primary Examiner* — Anthony M Haughton
*Assistant Examiner* — Theron S Milliser
(74) *Attorney, Agent, or Firm* — JCIPRNET (57) ABSTRACT

An electronic device includes a display surface, a back surface with a first portion and a second portion, and a support assembly. The support assembly includes a first, second, and third boards. The first board includes a first surface, detachably covering the first portion, and a second surface. The second board is bendably connected to the first board and combined with the second portion. The third board includes a pivoted end and a free end. The pivoted end is pivotally connected to the second surface and covers the second board and a portion of the first board. When the first board rotates relative to the first portion, the third board also rotates relative to the second board, the second surface faces the third board, and the second board simultaneously moves along the third board. Accordingly, the display surface is raised up a distance relative to the free end.

10 Claims, 7 Drawing Sheets

(56) References Cited

U.S. PATENT DOCUMENTS

| | | | | |
|---|---|---|---|---|
| 10,488,883 B2* | 11/2019 | Rothkopf | | G06F 1/1654 |
| 10,712,777 B2* | 7/2020 | Corbin | | A45C 15/00 |
| 11,181,948 B1* | 11/2021 | Tsuchihashi | | F16M 11/38 |
| 11,277,929 B2* | 3/2022 | Ku | | G06F 1/203 |
| 2012/0068797 A1* | 3/2012 | Lauder | | G06F 1/1656 |
| | | | | 29/428 |
| 2012/0194448 A1* | 8/2012 | Rothkopf | | G06F 1/1643 |
| | | | | 361/679.01 |
| 2013/0114198 A1* | 5/2013 | Gengler | | B65D 25/00 |
| | | | | 206/774 |
| 2014/0049911 A1* | 2/2014 | Corbin | | H04B 1/3822 |
| | | | | 361/679.58 |
| 2015/0049426 A1* | 2/2015 | Smith | | H01F 7/0252 |
| | | | | 220/230 |
| 2015/0153783 A1* | 6/2015 | Corbin | | A45C 15/00 |
| | | | | 361/679.56 |
| 2016/0224238 A1* | 8/2016 | Rothkopf | | G06F 1/1652 |
| 2017/0010633 A1* | 1/2017 | Corbin | | A45C 11/00 |
| 2017/0012661 A1* | 1/2017 | Smith | | G06F 1/1628 |
| 2017/0351298 A1* | 12/2017 | Li | | G06F 1/1616 |
| 2019/0064878 A1* | 2/2019 | Corbin | | G06F 1/1616 |
| 2019/0278329 A1* | 9/2019 | Corbin | | G06F 1/1673 |
| 2020/0128687 A1* | 4/2020 | Ku | | G06F 1/1681 |
| 2021/0349496 A1* | 11/2021 | Tsuchihashi | | F16M 13/022 |
| 2022/0095468 A1* | 3/2022 | Ku | | H05K 7/20163 |

* cited by examiner

ELECTRONIC DEVICE

CROSS-REFERENCE TO RELATED APPLICATION

This application claims the priority benefit of Taiwan application serial no. 110113878, filed on Apr. 19, 2021. The entirety of the above-mentioned patent application is hereby incorporated by reference herein and made a part of this specification.

BACKGROUND

Technical Field

The disclosure relates to an electronic device, and particularly relates to an electronic device having a support assembly.

Description of Related Art

Conventionally, an electronic device such as a tablet computer is usually placed on a support stand for better viewing. However, when the tablet computer is placed on the support stand, the tablet computer is usually at a height lower than the user's eyes, which is inconvenient for the user.

SUMMARY

The disclosure provides an electronic device, including a display surface, a back surface, and a support assembly. The back surface is opposite to the display surface and has a first portion and a second portion. The support assembly includes a first board, a second board, and a third board.

The first board includes a first surface and a second surface. The first surface detachably covers the first portion. The second board is bendably connected to the first board and combined with the second portion. The third board includes a pivoted end and a free end opposite to each other. The pivoted end is pivoted to the second surface, and the third board covers the second board and a portion of the first board.

When the first board rotates relative to the first portion, the third board also rotates relative to the second board, the second surface faces the third board, and the second board simultaneously moves along the third board, so that the display surface is raised up a distance relative to the free end.

The support assembly of the electronic device in the disclosure provides the function of raising the display surface, which is more convenient for the user.

BRIEF DESCRIPTION OF THE DRAWINGS

The accompanying drawings are included to provide a further understanding of the disclosure, and are incorporated in and constitute a portion of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Figure 1:
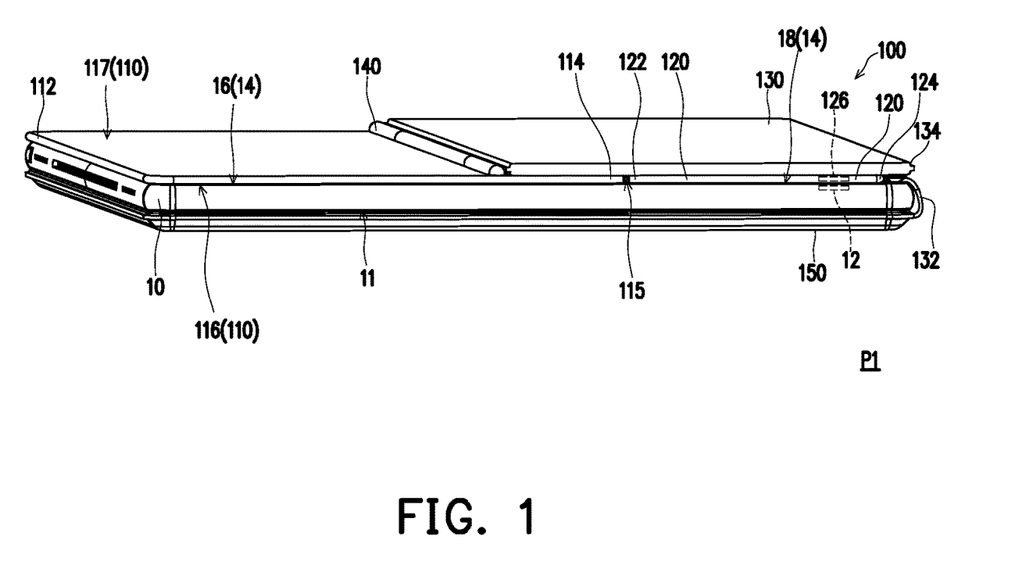
FIG. 1 is a schematic view illustrating an electronic device according to an embodiment of the disclosure.
Figure 2:
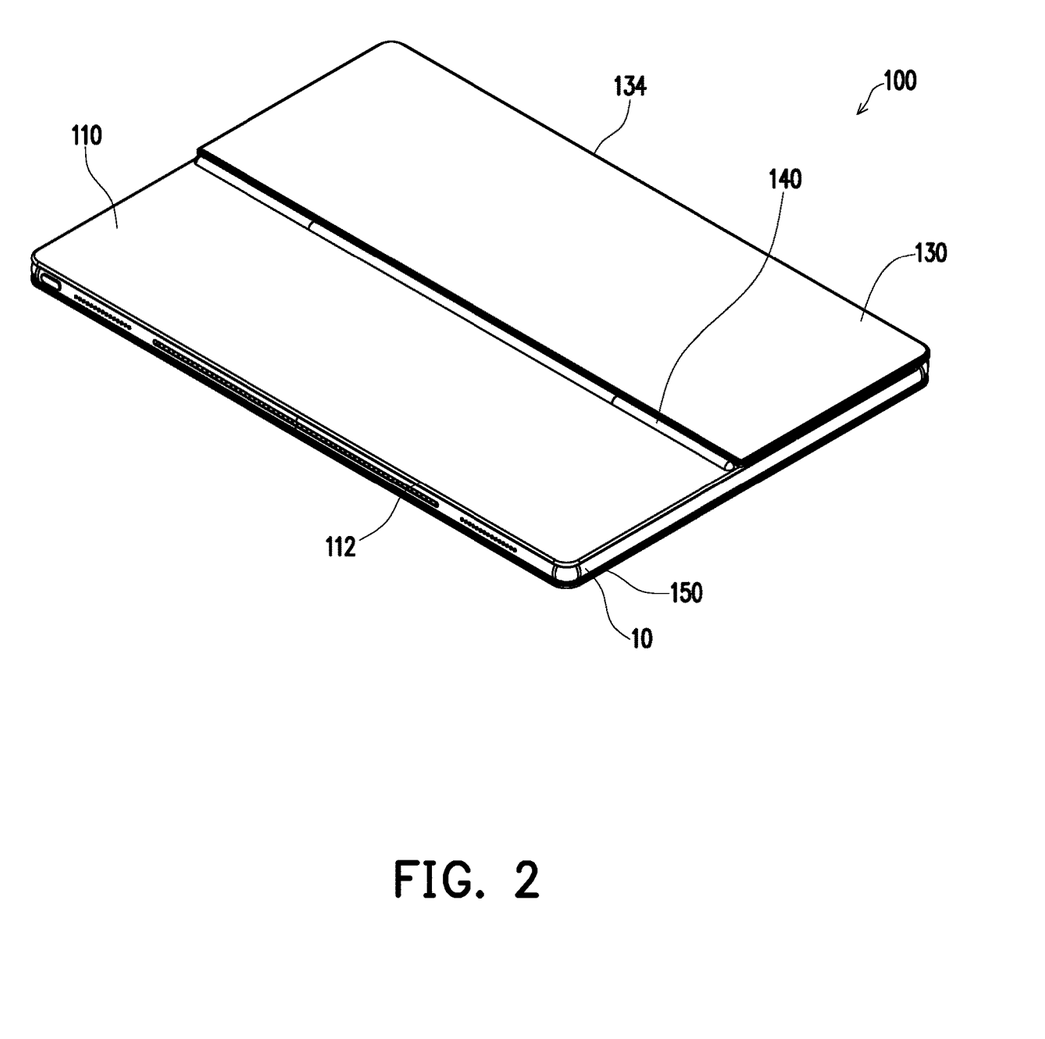
FIG. 2 is a schematic view illustrating another perspective of FIG. 1.

FIG. 1 is a schematic view illustrating an electronic device according to an embodiment of the disclosure. FIG. 2 is a schematic view illustrating another perspective of FIG. 1. Referring to FIGS. 1 and 2, an electronic device 10 of the embodiment includes a tablet computer or a mobile phone. However, the type of the electronic device 10 is not limited thereto. The electronic device 10 includes a display surface 11, a back surface 12 and a support assembly 100. The back surface 12 is opposite to the display surface 11 and has a first portion 16 and a second portion 18.

The support assembly 100 includes a first board 110, a second board 120, a third board 130, and a fourth board 150. The first board 110 includes a first surface 116, detachably covering the first portion 16, and a second surface 117.

The second board 120 is combined with the second portion 18. The third board 130 is pivoted to the second surface 117. In an embodiment, the third board 130 covers the second board 120 and a portion of the first board 110. The fourth board 150 is located on a lower side of the display surface 11.

In the embodiment, the second board 120 is bendably connected with the first board 110. Specifically, the first board 110 has a first end edge 112 and a second end edge 114 opposite to each other. The second board 120 has a third end edge 122 and a fourth end edge 124 opposite to each other. The third end edge 122 of the second board 120 is bendably connected with the second end edge 114 of the first board 110.

The third board 130 includes a pivoted end (such as a hinge structure 140) and a free end 134 opposite to each other. The pivoted end (the hinge structure 140) is pivoted to a portion of the first board 110 between the first end edge 112 and the second end edge 114, and is configured to provide a torque force for pivoting between the first board 110 and the third board 130.

The fourth board 150 is bendably connected with the free end 134 of the third board 130. Specifically, the support assembly 100 further includes a flexible segment 132 including, for example, a leather material, a cloth, or an elastic material. The flexible segment 132 is connected between the free end 134 of the third board 130 and the fourth board 150. Accordingly, the fourth board 150 is adapted to turn relative to the third board 130.

As shown in FIG. 1, in the embodiment, the second board 120 includes a combiner 126 adapted to fix the second portion 18. In other words, the combiner 126 is, for example, a first magnetic member adapted to magnetically attract the second portion 18, so that the second portion 18 is fixed to the second board 120.

In the embodiment, the electronic apparatus 10 includes a second magnetic member 12 corresponding to the first magnetic member. The first magnetic member and the second magnetic member 12 are, for example, magnets with opposite magnetic properties or a combination of a magnet and a metallic member. However, the disclosure is not limited thereto.

In other embodiments, the electronic device 10 includes a cover suitable to be magnetically attracted by the first magnetic member. In an embodiment, the combiner 126 is a hook, and the second portion 18 is fixed to the second board 120 through engagement.

In an embodiment, the combiner 126 is an adhesive, and the second portion 18 is fixed to the second board 120 through adhesion. The disclosure is not particularly limited by the type of the combiner 126.

Figure 3:
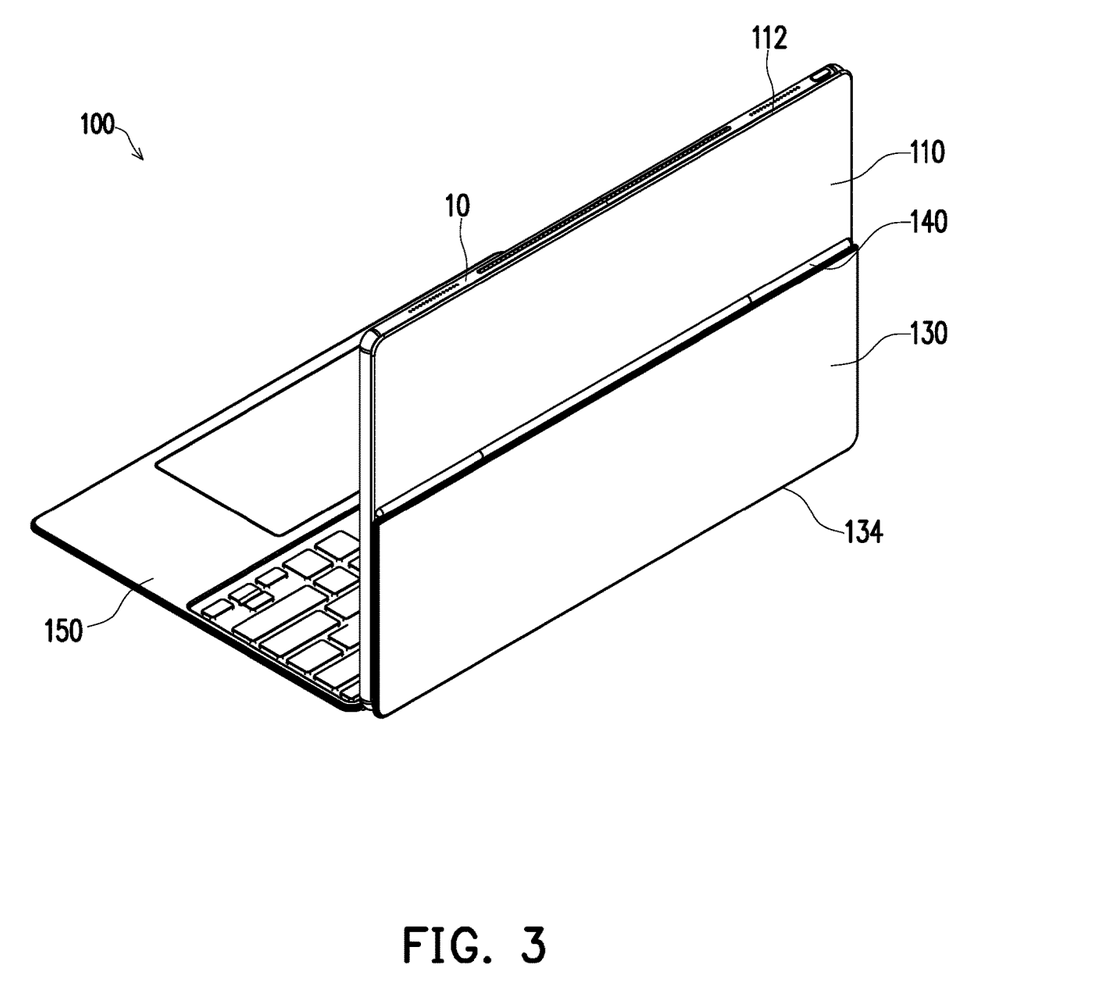
FIG. 3 is a schematic view illustrating that a first board, a second board, and a third board of a support assembly of the electronic device shown in FIG. 1 are turned relative to a fourth board.

FIG. 3 is a schematic view illustrating that a first board, a second board, and a third board of a support assembly of the electronic device shown in FIG. 1 are turned relative to a fourth board. Referring to FIG. 3, when the support assembly 100 is transformed to a support position P2 (FIG. 5), the first board 110, the second board 120 (FIG. 1), and the third board 130 of the support assembly 100 opens relative to the fourth board 150. As shown in FIG. 3, in the embodiment, the fourth board 150 is a keyboard module or any other input/output module. The disclosure is not limited herein.

Figure 4:
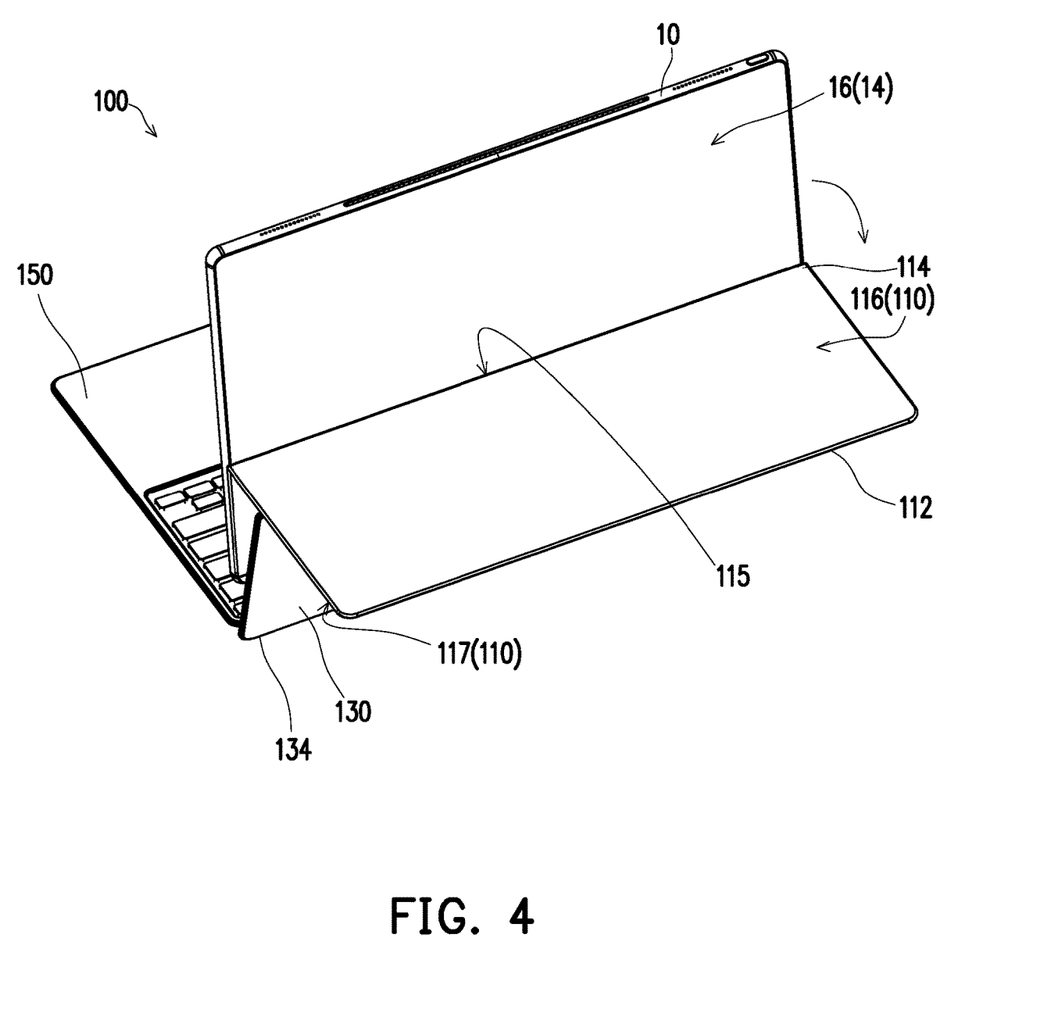
FIG. 4 is a schematic view illustrating that the first board of FIG. 3 rotates relative to the second board.

FIG. 4 is a schematic view illustrating that the first board of FIG. 3 rotates relative to the second board. Referring to FIG. 4, the first board 110 then rotates relative to the second board 120 along a folding line 115 between the first board 110 and the second board 120. Accordingly, the first board 110 is separated from the first portion 16.

Since the third board 130 is pivoted to the portion of the first board 110 between the first end edge 112 and the second end edge 114 through the hinge structure 140, when the first board 110 is turned, the first board 110 rotates relative to the third board 130. At this time, the third board 130 also rotates relative to the second board 120. Accordingly, the second surface 117 faces the third board 130.

Figure 5:
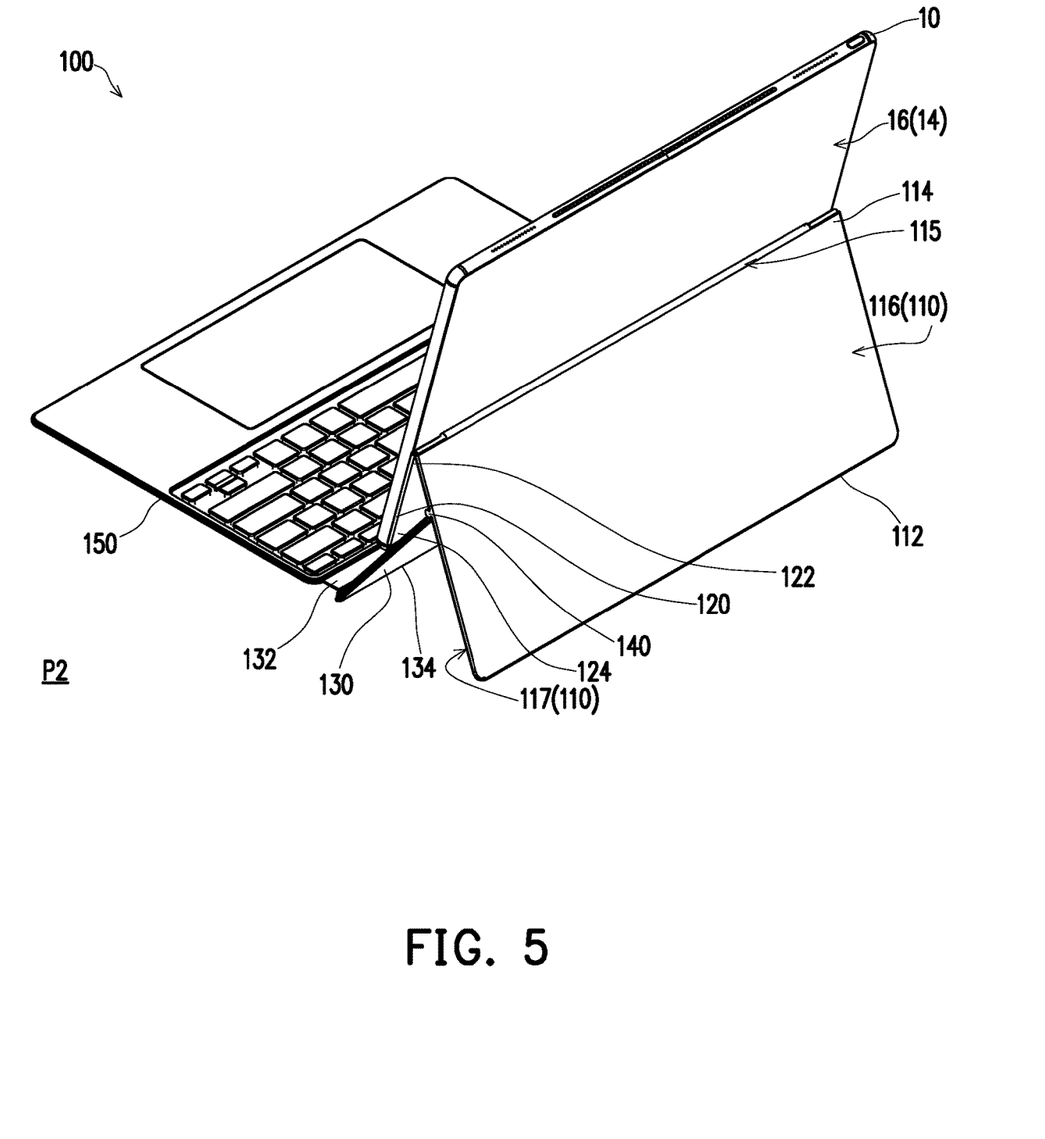
FIG. 5 is a schematic view illustrating that the electronic device of FIG. 1 is located at a support position.
Figure 6:
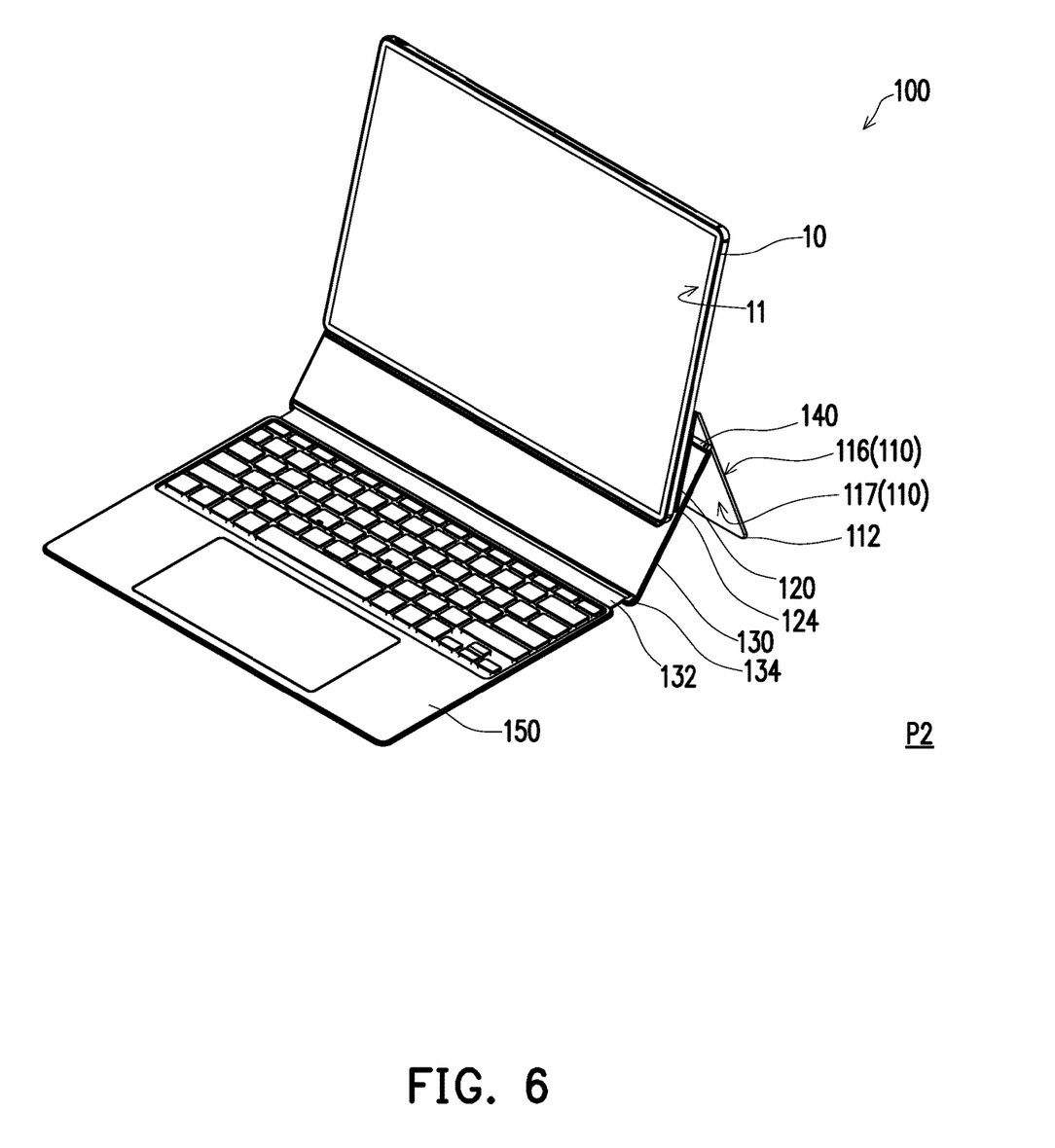
FIG. 6 is a schematic view illustrating another perspective of FIG. 5.

FIG. 5 is a schematic view illustrating that the electronic device of FIG. 1 is located at a support position. FIG. 6 is a schematic view illustrating another perspective of FIG. 5. Referring to FIGS. 5 and 6, by keep turning the first board 110 to turn the first end edge 112 of the first board 110 downward, the first board 110 and the third board 130 stand together. Specifically, the first end edge 112 of the first board 110 and the free end 134 of the third board 130 stand on a desk surface and serve as a support stand.

At this time, the third end edge 122 of the second board 120 is connected to the second end edge 114 of the first board 110. When the first board 110 turns and stands on the desk surface together with the third board 130, the second board 120 simultaneously moves along the third board 130. Accordingly, the second board 120 is raised up relative to the first board 110 and the third board 130, and the fourth end edge 124 of the second board 120 abuts against the third board 130.

Thus, as shown in FIG. 6, the fourth end edge 124 of the second board 120 is higher than the first end edge 112 of the first board 110 and the free end 134 of the third board 130, and the second portion 18 fixed to the second board 120 is raised and stand up. Thus, the display surface 11 is raised up a distance relative to the free end 134. The display surface 110 becomes closer to the height of human eyes. As a result, a more comfortable viewing experience is provided.

Also, in the embodiment, since the third board 130 is pivoted to the first board 110 through the hinge structure 140, the hinge structure 140 provides a torque force for the pivoting between the first board 110 and the third board 130. Thus, the angle between the first board 110 and the third board 130 is temporarily fixed. Consequently, the support assembly 110 is able to stably support the back surface 12.

When intending to adjust the angle of the display surface 11, the user only needs to exert a force to rotate the first board 110 relative to the third board 130, and the angle between the first board 110 and the second board 120 changes accordingly. Also, the angle of the display surface 11 relative to the desk surface changes accordingly. Thus, the user is allowed to adjust the tilting angle of the display surface 11 based on his/her own preference.

Figure 7:
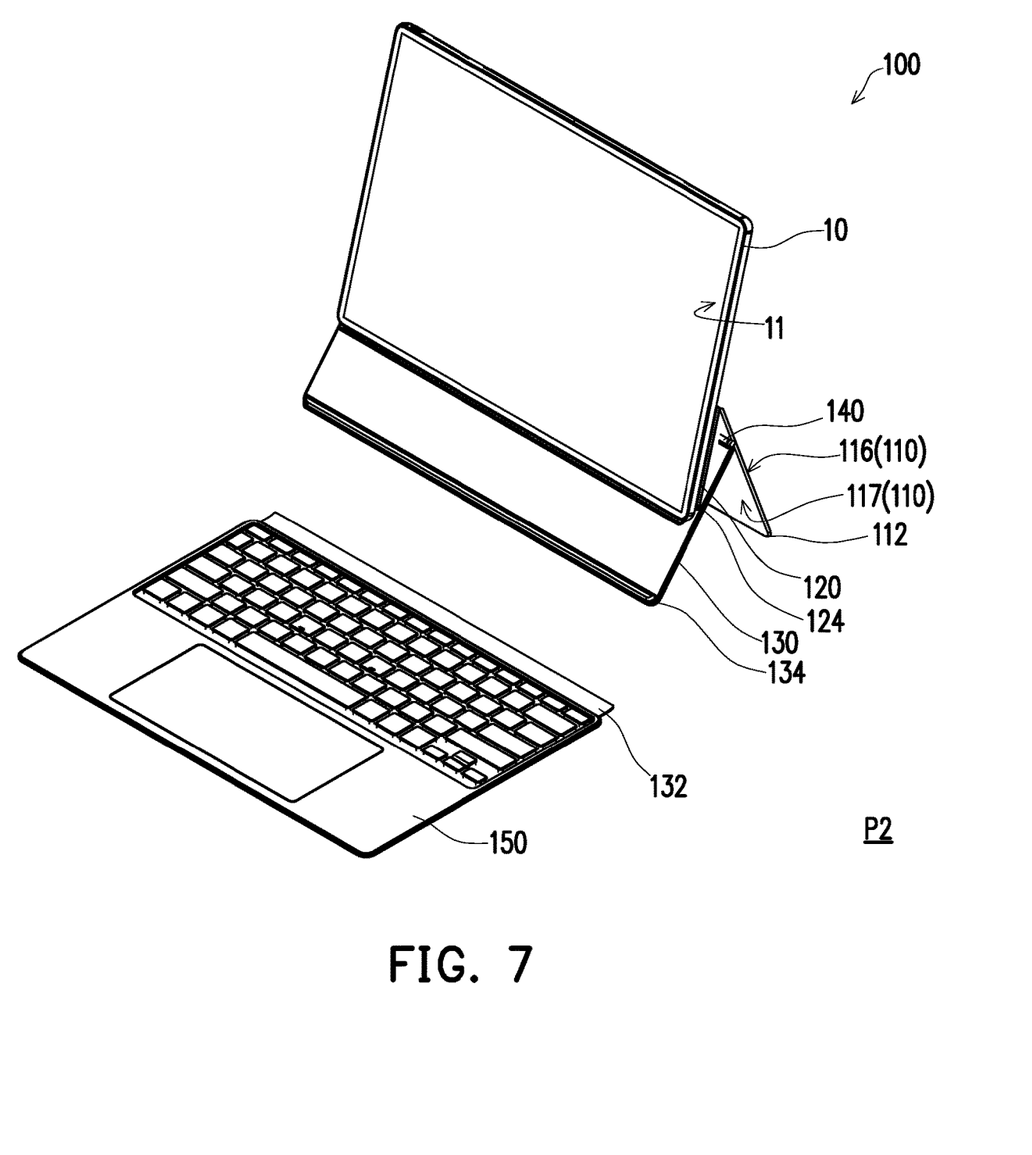
FIG. 7 is a schematic view illustrating that the fourth board of the support assembly shown in FIG. 6 is separated from the third board.

FIG. 7 is a schematic view illustrating that the fourth board of the support assembly shown in FIG. 6 is separated from the third board. Referring to FIG. 7, in the support assembly 100 of the embodiment, the fourth board 150 is detachably connected with the third board 130. The third board 130 and the fourth board 150 are connected with each other through magnetic attraction, engagement, or a hook-and-loop fastener, etc. When the user does not use the fourth board 150, the user separates the fourth board 150 from the third board 130 as shown in FIG. 7.

Based on the above, in the electronic device according to the embodiments of the disclosure, the second board is bendably connected with the first board, and the third board is pivoted to the first board. When the electronic device is located at an accommodated position, the first board and the second board cover the back surface, and the third board covers the second board and a portion of the first board to protect the back surface.

When the first board rotates relative to the first portion, the third board also rotates relative to the second board, the second surface faces the third board, and the second board simultaneously moves along the third board, so that the display surface is raised up a distance relative to the free end. Therefore, the support assembly of the electronic device in the disclosure provides the function of raising the display surface, which is more convenient for the user.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An electronic device, comprising:
 a display surface;
 a back surface, opposite to the display surface and having a first portion and a second portion; and
 a support assembly, comprising:
  a first board, comprising a first surface and a second surface, wherein the first surface detachably covers the first portion;
  a second board, bendably connected to the first board and fixed to the second portion when the first surface is parallel to the first portion; and
  a third board, comprising a pivoted end and a free end opposite to each other, wherein the pivoted end is pivoted to the second surface, and the third board covers the second board and a portion of the first board when the third board is parallel to the first board and the second board, wherein, when the first board rotates relative to the first portion, the third board also rotates relative to the second board, the second surface faces the third board, and the second board simultaneously moves along the third board, so that the display surface is raised up a distance relative to the free end.

2. The electronic device as claimed in claim 1, wherein the first board has a first end edge and a second end edge opposite to each other, the second board has a third end edge and a fourth end edge opposite to each other, the third end edge is bendably connected with the second end edge, and the pivoted end is pivoted to the first board between the first end edge and the second end edge.

3. The electronic device as claimed in claim 2, wherein when the electronic device and the support assembly are located at a support position, the first end edge and the free end stand up together, and the fourth end edge abuts against the third board.

4. The electronic device as claimed in claim 3, wherein when the electronic device and the support assembly are located at the support position, the fourth end edge is higher than the first end edge and the free end.

5. The electronic device as claimed in claim 3, wherein the support assembly further comprises:

a fourth board, bendably connected with the free end, wherein when the electronic device and the support assembly are located at an accommodated position, the first board and the second board are located beside the back surface, and the fourth board is located beside the display surface.

6. The electronic device as claimed in claim 5, wherein the support assembly further comprises:

a flexible segment, connected between the free end and the fourth board.

7. The electronic device as claimed in claim 5, wherein the fourth board is detachably connected with the third board.

8. The electronic device as claimed in claim 1, wherein the second board comprises a combiner, and the combiner is a first magnetic member adapted to magnetically attract the electronic device to fix the electronic device to the second board.

9. The electronic device as claimed in claim 1, wherein the pivoted end is a hinge structure, and the hinge structure is pivoted to the first board.

10. The electronic device as claimed in claim 5, wherein the fourth board is a keyboard module.

* * * * *